United States Patent
Wittmann et al.

(10) Patent No.: US 12,515,957 B2
(45) Date of Patent: Jan. 6, 2026

(54) MODIFIED FINE PARTICULATE CARBON MATERIALS AND METHOD FOR PRODUCING SAME

(71) Applicant: Suncoal Industries GmbH, Ludwigsfelde (DE)

(72) Inventors: Tobias Wittmann, Berlin (DE); Jacob Podschun, Berlin (DE); Ulf Lüder, Teltow (DE); Gerd Schmaucks, Scheeßel (DE)

(73) Assignee: Suncoal Industries GmbH, Ludwigsfelde (DE)

( * ) Notice: Subject to any disclaimer, the term of this patent is extended or adjusted under 35 U.S.C. 154(b) by 530 days.

(21) Appl. No.: 18/042,659

(22) PCT Filed: Aug. 26, 2021

(86) PCT No.: PCT/EP2021/073685
§ 371 (c)(1),
(2) Date: Feb. 23, 2023

(87) PCT Pub. No.: WO2022/043470
PCT Pub. Date: Mar. 3, 2022

(65) Prior Publication Data
US 2024/0025747 A1    Jan. 25, 2024

(30) Foreign Application Priority Data

Aug. 26, 2020    (DE) .................... 10 2020 210 801.3

(51) Int. Cl.
*C01B 32/05*    (2017.01)
*C08K 3/04*    (2006.01)

(52) U.S. Cl.
CPC ................ *C01B 32/05* (2017.08); *C08K 3/04* (2013.01); *C01P 2004/51* (2013.01); *C01P 2006/12* (2013.01)

(58) Field of Classification Search
CPC .......... C01B 32/05; C01B 32/00; C08K 3/04; C01P 2004/51; C01P 2006/12; C01P 2004/61; Y02E 60/10; C09C 1/48; C09C 1/56; C09C 1/44; C09C 1/46; C09C 1/482; C09C 1/485; C09C 1/487; C09C 1/50; C09C 1/52; C09C 1/54; C09C 1/565; C09C 1/58; C09C 1/60
See application file for complete search history.

(56) References Cited

U.S. PATENT DOCUMENTS

2018/0340074 A1*  11/2018  Wittmann .............. B60C 1/0025
2022/0135408 A1    5/2022  Wittmann et al.

FOREIGN PATENT DOCUMENTS

| CL | 2021002011 A1 | 1/2022 |
| DE | 102016201801 A1 | 5/2017 |
| DE | 102018220946 A1 | 6/2020 |
| WO | 2010043562 A1 | 4/2010 |
| WO | 2020050767 A1 | 3/2020 |

OTHER PUBLICATIONS

Translation of PCT International Search Report in PCT/EP2021/073685 dated Dec. 10, 2021, 2 pages.

* cited by examiner

Primary Examiner — Daniel C. McCracken
(74) Attorney, Agent, or Firm — Servilla Whitney LLC

(57) ABSTRACT

The invention relates to fine particulate carbon material, and to a method of production and the use thereof.

22 Claims, No Drawings

MODIFIED FINE PARTICULATE CARBON MATERIALS AND METHOD FOR PRODUCING SAME

CROSS-REFERENCE TO RELATED APPLICATIONS

This application is the National Stage entry of PCT/EP2021/073685, filed on Aug. 26, 2021, which claims priority to Germany Appln. Ser. No. 10 2020 210 801.3, filed on Aug. 26, 2020, which are incorporated herein by reference in their entireties.

The present invention relates to finely divided, modified particulate carbon materials, methods for their production and their use.

STATE OF THE ART

Finely divided, modified particulate carbon materials are employed in many fields of application. These range from the use as a black coloring agent to the use as filler in polymers, for example elastomers, thermoplastics or thermoplastic elastomers. Such carbon-based materials may be for example carbon black, that is, materials with a relatively high proportion of carbon. Other particulate carbon materials are obtained from regrowing raw materials. Such particulate carbon materials have a somewhat lower proportion of carbon, as compared to carbon black, but show interesting properties due to a high degree of functionalization. Starting materials of particular interest for the production of particulate carbon materials based on regrowing raw materials are starting materials that can be completely or partially brought into solution, for example sugars, starch or lignin. Such completely or partially dissolved starting materials based on regrowing raw materials can be converted into particulate carbon materials by precipitation processes. Precipitation processes for the production of particulate carbon materials that are dissolved are sufficiently known to the person skilled in the art.

For example, a lignin-based particulate carbon material can be obtained from lignin that is dissolved e.g., in liquid sodium hydroxide, by a precipitation by means of introducing an acidic gas, such as $CO_2$ or $H_2S$, or by adding an acid such as $H_2SO_4$. Examples for this prior art are given in WO2006031175, WO2006038863 or WO2009104995.

Furthermore, a lignin-based particulate carbon material can be obtained from lignin dissolved in a base, for example liquid sodium hydroxide, by increasing the temperature to, for example, hydrothermal carbonization conditions by precipitation with simultaneous stabilization. Examples for this prior art are described in WO 2016/020383 or WO 2017/085278. Methods for precipitation by introducing an acidic gas, by adding an acid or by increasing the temperature can even be combined.

In the production of particulate carbon materials, the adjustment of certain process parameters opens up the possibility of influencing in particular the particle sizes to be obtained (that is, the size of the agglomerates to be obtained, which may be built up from primary particles) or the particle size distribution, as well as the adjustment of surface parameters, in particular the specific surface area, which is also used as a measure of the primary particle size.

The particle size or the particle size distribution can for example be quantified by screen analysis or by laser diffraction. For example, a screen analysis for the dry particulate carbon material may be performed according to DIN 66165. Laser diffraction may be performed according to ISO13320, for example, for the particulate carbon material dispersed in water.

The primary particle size may be quantified, for example, by methods for the determination of the specific surface area such as BET determinations or STSA determinations. Here, a BET measurement determines the sum of the outer and inner surface areas, while an STSA determination determines only the outer surface area. Suitable determination methods are given, for example, in ASTM D 6556-14. When choosing the temperature of the outgassing, care should be taken that it should be set at a value of about 150° C. for the examination of particulate carbon materials.

It is known that the average size of the primary particles or the size of the specific surface area has an influence on the properties of the materials produced using the particulate carbon materials, for example, rubber articles produced by compounding the particulate carbon material with elastomers with subsequent crosslinking. For example, the abrasion characteristics of a rubber article are different depending on whether particulate carbon materials with higher or lower BET surface areas are employed. The situation is similar for mechanical properties such as tensile strength. Higher values for the BET surface area correlate with higher tensile strength values and lower abrasion. Here, when particulate carbon materials are employed, specific surface area values of at least 5 $m^2/g$, preferably at least 8 $m^2/g$, further preferably at least 10 $m^2/g$, moreover preferably at least 15 $m^2/g$ or more, are often required to obtain high quality rubber articles.

However, a disadvantage of the known particulate carbon materials obtained, for example, by precipitation of raw materials based on regrowing raw materials, in particular of lignin-based particulate carbon materials, that are dissolved in whole or in part, is the unpleasant odor that emanates from the particulate carbon material itself, is released during processing of the particulate carbon material and/or emanates from the materials containing the particulate carbon material. This severely limits the potential applications of particulate carbon materials, which are in themselves of high interest.

The unpleasant odor of lignocellulose-based materials is caused in particular by thermal or chemical degradation processes of the lignin, hemicellulose and cellulose and other wood constituents (e.g., resins) that are formed during the processing of the wood.

The compounds that cause the unpleasant odor include sulfur-containing substances such as dimethyl sulfide, dimethyl disulfide, dimethyl trisulfide or dimethyl tetrasulfide, or phenolic substances such as phenol, guaiacol, ethyl guaiacol and the like.

In addition, a variety of volatile organic compounds are released. Volatile organic compounds, also known as VOCs, include volatile organic substances that evaporate easily or are already present as a gas at lower temperatures, such as room temperature. The volatile organic compounds VOC are either already present in the wood material and are released from it during processing or, according to current knowledge, they are formed by the decomposition of fatty acids, which in turn are decomposition products of the wood. Typical conversion products that occur during processing are, for example, higher aldehydes or also organic acids. Organic acids result in particular as decomposition products of the wood components cellulose, hemicelluloses and lignin, wherein mostly alkanoic acids such as acetic acid, propionic acid, hexanoic acid or aromatic acids are formed. Aldehydes are formed from the basic building blocks of cellulose or hemicellulose during hydrolytic processing. Thus, e.g., the aldehyde furfural is formed from mono- and disaccharides of cellulose and hemicellulose, respectively, while aromatic aldehydes may be released during the partial hydrolytic digestion of lignin. Other aldehydes released are the higher aldehydes hexanal, pentanal or octanal, among others.

Methods for odor reduction of particulate carbon materials that are based on lignin are known in the prior art. On the one hand, these rely on the pre-purification of lignin, for example by extraction processes (WO2013/101397), enzymatically catalyzed reactions (DE 10 2006 057566), treatment with oxidizing components with subsequent washing (DE 10 1013 001678), on the other hand on the treatment of, for example, black liquor, by evaporation processes, treatment with reducing agents or oxidizing agents or also chlorination reactions as well as high-temperature treatments. However, such methods require the treatment of relatively large quantities of material, or they involve the use of chemicals, which is disadvantageous in terms of both equipment and financial expenses.

Methods for treating hydrothermally carbonized lignin at elevated temperature are known, for example, from EP 3053929. In EP 3053929, a hydrothermally carbonized lignin is subjected to stabilization, preferably under an inert gas, for the purpose of final treatment, for example in an activation. The hydrothermal carbonization is carried out at temperatures between 150° C. and 300° C., preferably at 150° C.-250° C. Stabilization is carried out at a suitable temperature, this temperature lying at least 30° C. above the temperature of the hydrothermal carbonization. The temperatures of the stabilization lie between 200 and 700° C., preferably 300 and 600° C., ideally 500-600° C. Thus, a minimal temperature of the stabilization of 330° C. results at a temperature of the hydrothermal carbonization of 300° C., and a temperature of the stabilization of 280° C. results at a temperature of the hydrothermal carbonization of 250° C. Here, the heating rate is between 0.1-20° C./min. In the process, gases, mainly oxygen and hydrogen, escape from the material and are preferably evacuated during the processing. The purpose of this thermal treatment is to stabilize the hydrothermally carbonized lignin in such a way that it is prepared for final processing, preferably activation, to produce activated carbon.

Methods for reducing the odor of wood at elevated temperature are known, for example, from EP 3 170 635 B1. In this process, long wood chips with a length between 150 and 200 mm, a width between 15 and 20 mm and a thickness between and 2 mm are torrefied at temperatures between 150° C. and 300° C. in an oxygen-poor or oxygen-free atmosphere for a duration between 1 and 5 hours. The loss of mass is between 10 and 30%.

It would therefore be desirable to be able to provide a method that enables targeted reduction of the odor that emanates from the particulate carbon material itself, is released during processing of the particulate carbon material and/or emanates from the materials containing the particulate carbon material, without the use of further process chemicals, preferably by treating the particulate carbon material already obtained. In this way, costs and efforts in terms of equipment can be reduced, while at the same time the amount of material to be processed is lower. However, another requirement of such a process is that the desirable properties of the particulate carbon material, such as the particle size or the particle size distribution, or the primary particle size or the specific surface area, should not be lost during the odor reduction treatment.

However, another disadvantage of the known particulate carbon materials obtained, for example, by precipitation of completely or partially dissolved starting materials based on regrowing raw materials, in particular of lignin-based particulate carbon materials, is their high polarity. This severely limits the possible applications of the particulate carbon materials, which are in themselves of high interest, especially as additives, reagents or fillers, when they are used in materials with significantly different polarity.

It would therefore also be desirable to be able to provide a method by which the polarity of the particulate carbon material can be selectively adjusted, preferably by treating the particulate carbon material already obtained. In this way, costs and efforts in terms of equipment can be reduced, while at the same time the amount of material to be processed is lower. However, another requirement of such a process is that the desirable properties of the particulate carbon material, such as the particle size or the particle size distribution, or the primary particle size or the specific surface area, should not be lost during the treatment for adjusting the polarity.

Also, the loss of material should not be too high, since the particulate carbon material already is a valuable product.

OBJECT OF THE INVENTION

Thus, it is the object of the present invention to provide corresponding particulate carbon materials as well as methods for their production so as to be able to provide the particulate carbon materials described hereinabove.

SHORT DESCRIPTION OF THE INVENTION

This object is achieved by the subject matters as defined in the claims. Preferred embodiments and further aspects of the present invention result from the embodiments given in the further claims and the following detailed description.

In particular, a first subject matter of the present invention is a particulate carbon material that has
- a $^{14}C$ content that is higher than 0.20 Bq/g carbon, but lower than 0.45 Bq/g carbon,
- a D50 of the particle size distribution of less than 500 μm and of more than 0.5 μm, and
- an OH group density of at least 0.05 mmol/g and at maximum 0.4 mmol/g, and wherein
- the solubility of the particulate carbon material in alkaline liquids is less than 25%.

Another subject matter of the present invention is a method for producing the particulate carbon material according to the invention that contains at least two process steps, wherein, in a first process step, a particulate carbon material pCM is provided that represents a precursor of the particulate carbon material according to the invention and is different therefrom, and which subsequently is modified, in a second process step, by heating under gas atmosphere, whereby then the particulate carbon material according to the invention can be obtained, which preferably is odor-reduced.

Another subject matter of the present invention is a use of the particulate carbon material as an additive in polymer mixtures, in particular rubber mixtures such as elastomer mixtures.

Another subject matter of the present invention is a vulcanizable rubber composition comprising at least one rubber and at least one filler component, wherein the filler component contains at least the particulate carbon material according to the invention.

Another subject matter of the present invention is a vulcanized rubber composition obtainable by vulcanization of the vulcanizable rubber composition and having a swelling in alkaline liquids after 7 days of less than 25%.

DETAILED DESCRIPTION OF THE INVENTION

The method of the present invention allows for the production of finely divided particulate carbon materials that are reduced in odor and/or reduced in OH groups (that is, have reduced polarity) and are produced from starting materials based on regrowing raw materials. As mentioned above, such particulate carbon materials are another subject matter of the present invention.

A characteristic feature of the method according to the invention is, for example, that in a first process step a finely divided, particulate carbon material (hereinafter referred to as pCM) is preferably obtained, the odor of which is reduced in a second process step, whereby the odor-reduced pCM is obtained.

A characteristic feature of the method according to the invention is, for example, that in a first process step a finely divided, particulate carbon material (hereinafter referred to as pCM) is obtained, the OH group density of which (in particular on the surface of the material) is reduced, preferably adjusted, in a second process step, whereby the pCM reduced in OH groups is obtained.

By the process according to the invention, it is also possible to obtain a pCM which has a reduced odor and a reduced OH group density, preferably an adjusted OH group density. In this respect, the second process step can combine an odor reduction with a reduction, preferably an adjustment, of the OH group density. In the following, modified pCM is to be understood as an odor-reduced pCM or a pCM that is reduced in OH groups, or an pCM that is odor-reduced as well as reduced in OH groups. The modified pCM or the finely divided modified pCM thus represents particulate carbon material according to the invention and is obtained after the second process step. Finely divided pCM or pCM (both not yet modified, respectively) thus represents a precursor of the particulate carbon material of the invention and is obtained after the first process step and employed in the second process step.

According to the invention, the finely divided pCM is obtained in the first process step, preferably in the presence of a liquid, particularly preferably in the presence of water, and is converted into the modified pCM in the second process step, preferably in a gas atmosphere. According to the invention, a separation of liquid from the finely divided pCM preferably is carried out between the first and second process steps.

Both the particulate carbon material (modified pCM) according to the invention and its precursor (pCM), respectively, are preferably also referred to as "finely divided" in the context of the present invention. The term "finely divided" is defined hereinafter as a function of the BET surface area, the STSA surface area, and the D50 of the particle size distribution, respectively. Particularly preferably, "finely divided" in the sense of the present invention means that the respective particulate carbon material has a D50 (D50 value) of the particle size distribution of less than 500 µm and more than 0.5 µm. This fine division will also be referred to as PSD fine division, as defined hereinafter.

As already mentioned above, the particulate carbon material according to the invention is preferably also referred to as "modified" particulate carbon material or modified pCM in the context of the present invention. In this sense, the term "modified" means that the carbon material was obtained from a finely divided particulate carbon material pCM employed as starting material, which is different from the particulate carbon material according to the invention. The particulate carbon material according to the invention differs from the finely divided particulate carbon material pCM employed as starting material pCM in particular in that it can be obtained by heating the starting material in a gas atmosphere. By the heating, the modification mentioned above is achieved. In the context of the present invention, the particulate carbon material according to the invention preferably is also referred to as finely divided, modified particulate carbon material. The above statements apply cumulatively in this respect.

According to the invention, the morphology of the finely divided pCM is only marginally changed in the second process step. Thus, it is also characteristic for the present method and the particulate carbon material according to the invention that the fine division of the modified pCM is substantially reached already after the first process step. Thus, the second process stage of the present invention is configured in a way that the fine division of the pCM is only insignificantly changed and substantially only the odor of the finely divided pCM is reduced and/or the OH group density of the finely divided pCM is reduced or adjusted.

It has been shown to be advantageous if the finely divided pCM after the first process step has a BET surface area of at least 5 m$^2$/g, preferably at least 8 m$^2$/g, further preferably at least 10 m$^2$/g, moreover preferably at least 15 m$^2$/g, particularly preferably at least 20 m$^2$/g, moreover preferably at least 30 m$^2$/g, in particular at least m$^2$/g or more. Advantageously, the BET surface area is at maximum 200 m$^2$/g preferably at maximum 180 m$^2$/g, further preferably at maximum 150 m$^2$/g, particularly preferably at maximum 120 m$^2$/g. In the following, the fine division described in terms of the BET surface area will be referred to as the BET fine division.

Advantageously, the BET surface area of the finely divided pCM differs only by at maximum 20%, preferably by at maximum 15%, more preferably by at maximum 10% from its STSA surface area. Thus, the pCM preferably has only low porosity. As an alternative to measuring the BET surface area, the STSA surface area may also be used. In the following, the fine division described in terms of the STSA surface area will be referred to as the STSA fine division.

Further, it has been shown to be advantageous if the finely divided pCM has a D50 of the particle size distribution of less than 500 µm, preferably of less than 250 µm, further preferably of less than 100 µm, particularly preferably 50 µm, after the first process step. Advantageously, the D50 of the particle size distribution of the finely divided pCM is more than 0.5 µm, further preferably more than 1 µm, particularly preferably more than 5 µm, moreover preferably more than 10 µm. D50 means that 50% of the particles are smaller than the indicated value. In the following, the fine division described in terms of the PSD will be referred to as the PSD fine division.

The fine division of the finely divided pCM and of the modified pCM may therefore be described by its PSD fine division and/or BET fine division and/or STSA fine division.

One configuration of the method according to the invention is characterized in that in a first process step a finely divided pCM is obtained in the presence of a liquid,
    which is converted into a modified pCM in a gas atmosphere in a second process step, between the first process step and the second process step, a separation of liquid from the finely divided pCM is carried out, the fine division of the modified pCM after the second process step is at maximum 5 times smaller than the fine division of the finely divided pCM before the second process step, and/or the odor of the modified pCM after the second process step is reduced compared to the odor of the finely divided pCM before the second process stage, and/or the OH group density of the modified pCM after the second process step is reduced compared to the OH group density of the finely divided pCM before the second process stage.

The fine division of the pCM is decreased during the second process step by at maximum 5 times, preferably by at maximum 4 times 3 times, 2.5 times, 2 times, 1.75 times, 1.5 times, 1.4 times, 1.3 times, 1.2 times, 1.1 times.

A decrease of the fine division means that the D50 of the particle size distribution of the modified pCM is at maximum times, preferably at maximum 4 times, 3 times, 2.5 times, 2 times, 1.75 times, 1.5 times, 1.4 times, 1.3 times, 1.2 times, 1.1 times higher than the D50 of the particle size distribution of the finely divided pCM and/or the BET surface area of the modified pCM is at maximum 100%, preferably at maximum 5 times, preferably at maximum 4 times, 3 times, 2.5 times, 2 times, 1.75 times, 1.5 times, 1.4 times, 1.3 times, 1.2 times, 1.1 times smaller than the BET surface area of the finely divided pCM and/or the STSA surface area of the modified pCM is at maximum 100%, preferably at maximum 5 times, preferably at maximum 4 times, 3 times, 2.5 times, 2 times, 1.75 times, 1.5 times, 1.4 times, 1.3 times, 1.2 times, 1.1 times smaller than the STSA surface area of the finely divided pCM.

Preferably, the factor by which the BET surface area or the STSA surface area decreases in the second process step is smaller than the factor by which the D50 of the particle size distribution increases in the second process step.

Furthermore, it has been shown to be advantageous if the finely divided pCM after the first process step has an ash content of less than 15% by mass, preferably less than 12% by mass, 10% by mass, 8% by mass, 6% by mass, 5% by mass, 4% by mass, 3% by mass, 2% by mass. Advantageously, the ash content of the finely divided pCM is more than 0.25% by mass, preferably more than 0.5% by mass, further preferably more than 0.75% by mass.

Moreover, the finely divided pCM preferably exhibits a carbon content (relative to the ash-free dry substance (the ash-free dry substance content)) of from 40 to 80 mass % (% by mass), preferably from 50 to 80% by mass, more preferably from 60 to less than 80% by mass.

The finely divided pCM moreover preferably exhibits an OH group density of at least mmol/g, preferably at least 0.15 mmol/g, particularly preferably at least 0.2 mmol/g and at maximum 0.6 mmol/g, preferably at maximum 0.55 mmol/g, particularly preferably at maximum 0.5 mmol/g.

The finely divided pCM further preferably exhibits an OH group density of at least 1 $OH/nm^2$ BET surface area, preferably at least 1.5 $OH/nm^2$ BET surface area, particularly preferably at least 1.75 $OH/nm^2$ BET surface area, and at maximum 15 $OH/nm^2$ BET surface area, preferably at maximum 12 $OH/nm^2$ BET surface area, particularly preferably at maximum $OH/nm^2$ BET surface area. The determination of the OH group density (both in in mmol/g as well as in $OH/nm^2$) on the surface of the material is carried out according to Sipponen et al. (Determination of surface-accessible acidic hydroxyls and surface area of lignin by cationic dye adsorption; Bioresource Technology, 2014, 169: 80-87).

In the following, preferred embodiments of the first process step for obtaining a finely divided pCM will be described. In the context of the present invention, it is not relevant whether this first process step is carried out directly before the second process step or whether this first step is carried out significantly ahead of the second in terms of time (so that, for example, the pCM from the first step is produced separately and then stored or transported before being subjected to the second step).

Preferably, the finely divided pCM is obtained in the first process step by precipitation of a starting material that is dissolved in a liquid in whole or in part.

For this purpose, the starting material preferably is dissolved in a liquid, preferably in water, in whole or in part before the first process step. Further preferably, the dissolved starting material before the first process step consists of more than 50% preferably more than 60%, 70%, 75%, 80%, 85% of sugars (carbohydrates), starches or lignin.

The determination of the sugar content is carried out along the lines of TAPPI T 249 cm-00.

The determination of the starch content is carried out along the lines of TAPPI T 419.

The determination of the Klason lignin content is carried out along the lines of TAPPI T222 om-02. The determination of the acid-soluble lignin content is carried out along the lines of TAPPI T250 UM 250. In the following, the sum of Klason lignin and acid-soluble lignin will be referred to as the lignin content.

Liquids that contain lignocellulose and are for example suitable as starting materials result, e.g., as waste products, in the pulp industry, where large quantities of wood are processed. Depending on the method of the wood processing, it results in large quantities as KRAFT lignin, usually dissolved in black liquor, as hydrolysis lignin or as lignin sulfonate. Depending on the pH value in the respective processing method, the hydrogen atoms in the hydroxyl groups typical of lignin may be replaced proportionally by metal cations. Strictly speaking, the lignin sulfonate is already a chemical derivative of the lignin, since it presents additional sulfonate groups introduced during processing.

Accordingly, in one embodiment of the present method, black liquor is used as lignocellulose-containing liquid employed as starting material. Black liquor is a lignin-containing liquid resulting as waste liquor in an alkaline fractioning process for biomass, e.g., in a KRAFT process or a hydroxide process. The pH value of the black liquor is in the alkaline range, usually at a pH value of 12-14. Black liquor can contain further organic or inorganic constituents in addition to lignin. A characteristic of black liquor is that the lignin proportion in the organic dry substance is higher than 50%, in particular higher than 60% or even higher than 70%, which is therefore significantly higher than the lignin proportion in woody biomass that lies at 15%-35%.

If the starting material consists of more than 50% lignin, then the finely divided pCM is preferably obtained by precipitation of lignin dissolved in whole or in part in a liquid by introduction of an acidic gas and/or by addition of an acid and/or by precipitation. Such methods are in principle known to the skilled person and are described in WO2006031175 or WO2006038863 or WO2009104995. Advantageously, these methods are controlled in such a way that after the first process step a finely divided pCM characterized by a particle size distribution, a BET surface area and/or an STSA surface area as described above is present.

Alternatively, if the starting material consists of more than 50% lignin, the finely divided pCM is preferably obtained by precipitation and simultaneous stabilization under conditions of a hydrothermal carbonization (HTC). Such processes are in principle known to the skilled person and described in WO2016/020383 or WO2017/085278 (precipitation and simultaneous stabilization). Advantageously, these methods are controlled in such a way that after the first process step a finely divided pCM characterized by a particle size distribution, a BET surface area and/or an STSA surface area as described above is present.

Alternatively, the finely divided pCM is preferably obtained in the first process step by hydrolysis from a solid starting material, preferably from wood or straw. In the process, the solid starting material is comminuted before and/or during hydrolysis to such an extent that it is present, after the first process step, as finely divided pCM characterized by a particle size distribution, a BET surface area and/or an STSA surface area as described above. Since the carbohydrates contained in the starting material pass into solution during hydrolysis, the finely divided pCM has an increased lignin content compared to the starting material. Such finely divided pCMs obtained by hydrolysis advantageously have a lignin content of more than 60% by mass, preferably more than 65% by mass, particularly preferably more than 70% by mass. Advantageously, these methods are controlled in such a way that after the first process step a finely divided pCM characterized by particle size distribution, BET surface area and/or STSA surface area as described above is present.

In the following, preferred embodiments of the second process steps will be described. As mentioned above, the finely divided pCM obtained after the first process step can be converted into a finely divided modified pCM according to the invention by means of the second process step.

According to the invention, the pCM is converted to the modified pCM in a gas atmosphere in the second process step.

Advantageously, the second process step does not take place under atmospheric air, but under a process atmosphere. The process atmosphere is understood to mean, for example:

- an air enriched by means of inert gases, which has an oxygen content of less than 15% by volume, preferably less than 10% by volume, further preferably less than 5% by volume, particularly preferably less than 3% by volume; The absolute pressure of the air enriched by means of inert gas can be selected as required and is preferably at maximum 2000 mbar, further preferably at maximum 1500 mbar, and preferably at least 100 mbar, further preferably at least 200 mbar, 250 mbar, 500 mbar, 750 mbar.
- an inert gas; The absolute pressure of the inert gas may be selected as required and is preferably at maximum 2000 mbar, further preferably at maximum 1500 mbar, and preferably at least 100 mbar, further preferably at least 200 mbar, 250 mbar, 500 mbar, 750 mbar.
- an air reduced in pressure, with a pressure of less than 750 mbar, preferably less than 500 mbar, further preferably less than 250 mbar, in some instances less than 100 mbar.

Advantageously, the oxygen content of a process atmosphere consisting of air enriched by means of inert gas is at least 0.1% by volume, preferably at least 0.5% by volume, particularly preferably at least 1% by volume.

A suitable inert gas in the sense of the present invention is in particular nitrogen, carbon dioxide, superheated water vapor or gases released from the pCM during the second process step. Although the gas released from the pCM during the second process step also contains, for example, carbon monoxide, hydrogen, methane, or hydrogen sulfide, etc., it will be referred to as an inert gas in this document. When using air enriched by means of inert gas or when using inert gas as process atmosphere, the pressure may be selected according to the respective possibilities or requirements, as already indicated hereinabove. The simplest method in terms of equipment is to run the process at ambient pressure or at only slightly negative or positive pressure, for example at +−50, preferably +−25 mbar, particularly preferably +−10 mbar.

The second process step is preferably controlled (for example, by selecting the temperature profile, the maximum temperature, the process atmosphere, possibly selecting the pressure) in such a way that the loss of mass of the pCM in the second process step is less than 20%, preferably less than 15%, more preferably less than 10%, 9%, 8%, 7%, 6%, 5%, 4%, 3% or less. A certain loss of mass is required during the second process step of the method according to the invention in order to reduce the content of odorous substances and/or to reduce, preferably adjust, the OH group density. This loss of mass will typically be at least 1% or more, preferably at least 2% or more, in some instances 5% or more. This ensures and achieves that not too much material is lost and that, on the other hand, the desired odor reduction and/or reduction of the OH group density is achieved. In this way, the suitability of the modified pCM for use as a filler in elastomers, for example, can also be ensured.

Regardless of the selection of the process atmosphere of the second process step, the process temperature in the second process step should exceed a minimum temperature and should not exceed a maximum temperature. The maximum temperature is 300° C., preferably 250° C. or less, more preferably 240° C., particularly preferably 235° C. or less, moreover preferably 230° C. or less, particularly preferably 225° C., in some preferred instances 220° C., moreover preferably also 210° C., in rare cases even 200° C. or less. The minimum temperature is 80° C., preferably 100° C., preferably 120° C., preferably 130° C. or more, further preferably 150° C. or more, particularly preferably 160° C. or more, especially preferably 170° C. or more, in some instances 180° C. or more. The holding time for which the pCM is held in the process atmosphere at the process temperature in the second process step may be selected over a wide range. Suitable values are 1 second and more, as well as 5 hours or less. Preferably, the holding time is 60 minutes or less, further preferably 30 minutes or less, particularly preferably 15 minutes or less, in some instances less than 10 minutes. For continuous operation of the second process step, holding time is to be understood as the average holding time.

Preferably, the OH group density of the finely divided pCM is adjusted during the second process step. Advantageously, this adjustment is made by selecting the process temperature, preferably in combination with the process atmosphere, particularly preferably by adjusting the oxygen content of the process atmosphere.

By combining a low process temperature, for example, of preferably below 250° C., more preferably below 240° C., particularly preferably below 235° C. or less, moreover preferably below 230° C., particularly preferably below 225° C., in some preferred cases below 220° C., moreover preferably also below 210° C., in rare cases even below 200°

C., with an adjustment of the oxygen content, the OH group density can be adjusted in a targeted manner without subjecting the material to high thermal stress. Through this, the fine division is preserved as far as possible, the odor is reduced as far as possible and, in addition, the OH group density is adjusted.

It has been found to be advantageous that not only the pCM is treated under the process atmosphere in the second process step during the holding time, but that heating and cooling also take place under the process atmosphere.

If the pCM was obtained from softwood lignin in the first process step, for example, by precipitation with combined stabilization under hydrothermal carbonization conditions, a loss of mass of only 10% or less can be achieved with a second process step, for example, at a maximum temperature of the treatment of 250° C. or less, with a simultaneous loss of BET surface area of about 5 m$^2$/g or less (that is, if the pCM has a BET surface area of 40 m$^2$/g, this falls to a maximum of 35 m$^2$/g). At the same time, odor tests show a significant decrease in the development of unpleasant odors. This decrease has been found not only with the odor-reduced pCM per se, but also during the production of a rubber article with the odor-reduced pCM as a filler, as well as with the rubber article as compared to another one with a pCM that had not gone through the second process step.

The process according to the invention can thus achieve a good balance between desirable odor minimization and/or reduction of OH group density and at the same time a preservation of the desired material properties to the largest extent, as well as loss of mass. Neither the use of process chemicals nor complex procedures are necessary for this. Also, the maximum temperature of the treatment according to the invention is in a comparatively low range, which is advantageous both in terms of costs and process control.

Preferably, the second process step is carried out in a moving bed, in a fluidized bed, or in an entrained flow. Further preferably, the second process step may be combined with the separation of liquid. Advantageously, the separation of liquid is at least in part carried out by its evaporation. Advantageously, the evaporation of liquid is carried out preferably up to a dry substance content of >80%, preferably >85%, in such a way that the finely divided pCM reaches a temperature of at least 35° C., preferably at least 40° C., during evaporation.

Advantageously, the evaporation of liquid is carried out preferably up to a dry substance content of >80%, preferably >85%, in such a way that the finely divided pCM reaches a temperature of at maximum 130° C., preferably at maximum 125° C., further preferably at maximum 120° C., particularly preferably at maximum 115° C., moreover preferably at maximum 95° C., in particular at maximum 90° C., during evaporation. Advantageously, the finely divided pCM is heated up to the process temperature of the second process step only when it has a dry substance content of more than 85%, further preferably more than 90%, particularly preferably more than 95% by mass.

As already described above, the modified pCMs obtained according to the invention, preferably based on lignin and preferably obtained by a precipitation or a precipitation with combined stabilization, for example under conditions of hydrothermal carbonization, are also proposed for use in rubber mixtures.

In the context of the present invention, it has also been shown that modified pCMs produced according to the invention are also modified in polarity or hydrophobicity and are, for example, more compatible for use in hydrophobic or low-polarity elastomer compounds than pCMs produced according to the prior art. Preferably, elastomer compounds with modified pCM swell only conditionally in alkaline liquids. Preferably, the mass increase of the elastomer compound with modified pCM after 7 days in the medium is less than 25%, preferably less than 15%, more preferably less than 10%.

As mentioned above, the first subject matter of the present invention is a modified pCM that is in particular provided by the method according to the invention, that is, a particulate carbon material, that has
- a $^{14}$C content that is higher than 0.20 Bq/g carbon, but lower than 0.45 Bq/g carbon,
- a D50 of the particle size distribution of less than 500 μm and of more than 0.5 μm, and
- an OH group density of at least 0.05 mmol/g and at maximum 0.4 mmol/g, and wherein
- the solubility of the particulate carbon material in alkaline liquids is less than 25%.

Preferably, the particulate carbon material according to the invention has
- a $^{14}$C content that is higher than 0.23 Bq/g carbon, but preferably lower than 0.45 Bq/g carbon, and/or
- a carbon content relative to the ash-free dry substance between 60% by mass and 80% by mass, and/or
- no glass transition temperature measurable according to DIN 53765-1994, and/or
- a content of volatile constituents, measured at 950° C. according to DIN 53552, of more than 30% by mass, and/or
- a content of volatile constituents, measured at 200° C. according to DIN 53552 of less than 5% by mass.

Advantageously, the BET surface area of the modified pCM is at least 5 m$^2$/g, preferably at least 8 m$^2$/g, further preferably at least 10 m$^2$/g, moreover preferably at least 15 m$^2$/g, particularly preferably at least 20 m$^2$/g, moreover preferably at least 30 m$^2$/g, in particular at least 35 m$^2$/g or more. Advantageously, the BET surface area of the modified pCM is at maximum 200 m$^2$/g, preferably at maximum 180 m$^2$/g, further preferably at maximum 150 m$^2$/g, particularly preferably at maximum 120 m$^2$/g.

Advantageously, the BET surface area of the modified pCM differs only by at maximum 20%, preferably by at maximum 15%, more preferably by at maximum 10% from its STSA surface area. Thus, the modified pCM preferably has only low porosity.

The D50 of the particle size distribution of the modified pCM is less than 500 μm, preferably less than 250 μm, further preferably less than 100 μm, particularly preferably less than 50 μm. Advantageously, the D50 of the particle size distribution of the modified pCM is more than 0.5 μm, preferably more than 1 μm, particularly preferably more than 5 μm, moreover preferably more than 10 μm. Particularly preferably, the D50 of the particle size distribution of the modified pCM is more than 5 μm, moreover preferably more than 10 μm.

Advantageously, the modified pCM has an ash content of less than 15% by mass, preferably less than 12% by mass, 10% by mass, 8% by mass, 6% by mass, 5% by mass, 4% by mass, 3% by mass, 2% by mass or less. Advantageously, the ash content of the modified pCM is more than 0.25% by mass, preferably more than 0.5% by mass, further preferably more than 0.75% by mass. Particularly preferably, the modified pCM has an ash content of less than 4% by mass, 3% by mass, 2% by mass or less, and more than 0.25% by mass, preferably more than 0.5% by mass, further preferably more than 0.75% by mass.

Moreover, the modified pCM exhibits an OH group density of at least 0.05 mmol/g, preferably at least 0.075 mmol/g, particularly preferably at least 0.1 mmol/g. The modified pCM exhibits an OH group density of at maximum 0.4 mmol/g, preferably at maximum 0.35 mmol/g, particularly preferably at maximum 0.3 mmol/g, in some instances less than 0.25 mmol/g, in rare cases less than 0.2 mmol/g.

The modified pCM is only conditionally soluble in in alkaline liquids. The solubility of the modified pCM is lower than 25%, preferably lower than 15%, particularly preferably lower than 10%. The soluble proportion is determined according to the method described hereinafter. Preferably, the alkaline liquids represent aqueous solutions of NaOH, particularly preferably aqueous solutions having a concentration of 0.1 Mol/l.

The modified pCM preferably has a reduced odor. Thus, in particular the proportion of emission of sulfur-containing and phenolic substances is reduced. It has been possible, however, to reduce the emission of some VOCs such as, e.g., acetic acid, too. One method for the determination of the amount of emissions is described hereinafter.

Preferably, the modified pCM has a proportion of dimethyl sulfide of at maximum 1 mg/kg, preferably of at maximum 0.5 mg/kg, further preferably less than 0.1 mg/kg, moreover preferably of less than 0.05 mg/kg, in particular of less than 0.01 mg/kg.

Preferably, the modified pCM has a proportion of guaiacol and methylguaiacol (creosol), respectively, of at maximum 1 mg/kg, preferably of at maximum 0.5 mg/kg, further preferably less than 0.1 mg/kg, moreover preferably of less than 0.05 mg/kg, in particular of less than 0.01 mg/kg, respectively.

Preferably, the modified pCM has a naphthalene content (DIN EN 16181:2017-11/draft) of less than 5 mg/kg. Preferably, the sum of the 18 EPA-PAHs without BG (DIN EN 16181:2017-11/draft) is less than 5 mg/kg. Preferably, no content (<0.1 mg/kg) of benzo[a]anthracene, chrysene, benzo[b]fluoranthene, benzo[k]fluoranthene, benzo[a]pyrene, indenol[1,2,3-cd]pyrene, dibenzo[a,h]anthracene, benzo[ghi]perylene, benzo(e)pyrene and benzo[i]fluoranthene is detectable in the modified pCM (DIN EN 16181: 2017-11/draft).

Preferably, the modified pCM has a content of the outgassable individual components
2-methoxyphenol
phenol
guaiacol
4-methoxy-3-methyl-phenol
4-propanolguaiacol
2-methoxy-4-methylphenol
2-methoxy-4-ethylphenol
4-propylguaiacol
methanol, as determined by thermal desorption analysis according to VDA 278 (May 2016), respectively, of less than 50 µg/g of modified pCM, preferably of 25 µg/g of modified pCM, particularly preferably of less than 15 µg/g of modified pCM, moreover preferably of less than 10 µg/g of modified pCM, in particular preferably of less than 5 µg/g of modified pCM, in some instances of less than 1 µg/g of modified pCM.

Preferably, the OAN of the modified pCM is higher than 150 ml/100 g, more preferably higher than 151 ml/100 g, in particular higher than 151 ml/100 g.

Preferably, the OAN of the modified pCM is lower than 200 ml/100 g, particularly preferably lower than 180 ml/100 g, in particular lower than 170 ml/100 g.

Preferably, the electrical resistance of an SBR polymer mixture, cross-linked by means of sulfur and filled with 120 phr of modified pCM, is higher than 1.0 E 10 Ohm*cm.

Preferably, the modified pCM can be obtained by a method that contains at least two process steps, wherein, in a first process step, the particulate carbon material pCM is provided that represents a precursor of the particulate carbon material according to the invention and is different therefrom, and which subsequently is modified, in a second process step, by heating under gas atmosphere, whereby then the modified pCM can be obtained, which preferably is odor-reduced.

Preferably, the particulate carbon material pCM obtainable according to the first process step had a D50 of the particle size distribution of less than 500 µm and more than 0.5 µm before the heating in the gas atmosphere.

Preferably, the OH group density of the employed particulate carbon material pCM is reduced or adjusted by the heating in the gas atmosphere according to the second process step, whereby the modified pCM with an OH group density as defined hereinabove can be obtained.

Preferably, the second process step does not take place under atmospheric air, but under a process atmosphere that consists of air enriched by means of inert gas, having an oxygen content of less than 15% by vol., preferably of less than 10% by vol., further preferably of less than 5% by vol., particularly preferably of less than 3% by vol., wherein the oxygen content preferably is at least 0.1% by vol., particularly preferably at least 0.5% by vol., more particularly preferably at least 1% by vol.

Preferably, the particulate carbon material pCM provided in the first process step is obtained by precipitation of a starting material, preferably a lignin-based starting material, dissolved in whole or in part in a liquid.

Preferably, the process temperature in the second process step is at maximum 50° C. below and at maximum 50° C. above the temperature of the following processing and/or the temperature of use, and the process temperature does not exceed a maximum temperature and does not fall below a minimum temperature.

Preferably, the D50 of the particle size distribution of the modified particulate carbon material obtainable after the second process step is at maximum 5 times, preferably at maximum 4 times, 3 times, 2.5 times, 2 times, 1.75 times, 1.5 times, 1.4 times, 1.3 times, 1.2 times, 1.1 times higher than the D50 of the particle size distribution of the particulate carbon material pCM provided in the first process step.

Another subject matter of the present invention is a method for producing the particulate carbon material according to the invention, the method containing at least two process steps, wherein, in a first process step, a particulate carbon material pCM is provided that represents a precursor of the particulate carbon material according to the invention and is different therefrom, and which subsequently is modified, in a second process step, by heating under gas atmosphere, whereby then the particulate carbon material according to the invention can be obtained, which preferably is odor-reduced.

Another subject matter of the present invention is a use of the particulate carbon material according to the invention as an additive in polymer mixtures, in particular rubber mixtures, such as elastomer mixtures.

Another subject matter of the present invention is a vulcanizable rubber composition comprising at least one rubber and at least one filler component, wherein the filler component contains at least the particulate carbon material according to the invention.

The rubber composition may moreover contain at least one vulcanization system that comprises at least one cross-linking agent. Examples for such cross-linking agents are sulfur and/or peroxide. Examples for rubbers that can be employed are natural rubber (NR), halobutyl rubbers, in turn preferably selected from the group consisting of chlorobutyl rubbers (CIIR; chloro-isobutene-isoprene rubber) and bromobutyl rubbers (BIIR; bromo-isobutene-isoprene rubber), butyl rubber or isobutylene-isoprene rubber (IIR; isobutene-isoprene rubber), styrene-butadiene rubber (SBR), in turn preferably SSBR (solution polymerized SBR) and/or ESBR (emulsion polymerized SBR), polybutadiene (BR, butadiene rubber), acrylonitrile-butadiene rubbers (NBR, nitrile rubber) and/or HNBR (hydrated NBR), chloroprene (CR), polyisoprene (IR), ethylene-propylene-diene rubber (EPDM), and mixtures thereof.

Another subject matter of the present invention is a vulcanized rubber composition obtainable by vulcanization of the vulcanizable rubber composition and having a swelling in alkaline liquids after 7 days of less than 25%. The swelling is determined according to DIN ISO 1817:2015 in 0.1 mol NaOH.

Determination Methods

1. Determination of the $^{14}C$ Content

The determination of the $^{14}C$ content (content of biologically based carbon) is carried out by means of the radiocarbon method according to DIN EN 16640:2017-08.

2. Determination of the Particle Size Distribution

The particle size distribution can be determined by laser diffraction of the material dispersed in water (1% by weight in water) according to ISO 13320:2009. The volume fraction is specified, for example, as D50 in μm (the diameter of the particles of 50% of the volume of the sample is below this value).

3. Determination of the Carbon Content

The carbon content is determined by elemental analysis according to DIN 51732: 2014-7.

4. Determination of the Dry Matter Content

The dry matter content of the sample was determined along the lines of DIN 51718:2002-06 as follows. For this purpose, the MA100 moisture balance from the company Sartorius was heated to a dry temperature of 105° C. The dry sample, if not already in powder form, was mortared or ground to a powder. Approximately 2 g of the sample to be measured was weighed on a suitable aluminum pan in the moisture balance and then the measurement was started. As soon as the weight of the sample did not change by more than 1 mg for 30 s, this weight was considered constant and the measurement was terminated. The dry matter content then corresponds to the displayed content of the sample in % by weight. At least one duplicate determination was performed for each sample. The weighted mean values were reported.

5. Determination of the Ash Content

The water-free ash content of the samples was determined by thermogravimetric analysis in accordance with the DIN 51719 standard as follows: Before weighing, the sample was ground or mortared. Prior to ash determination, the dry matter content of the weighed-in material is determined. The sample material was weighed to the nearest 0.1 mg in a crucible. The furnace, including the sample, was heated to a target temperature of 815° C. at a heating rate of 9° K/m in and then held at this temperature for 2 h. The furnace was then cooled to 300° C. before the samples were taken out. The samples were cooled to ambient temperature in the desiccator and weighed again. The remaining ash was correlated to the initial weight and thus the weight percentage of ash was determined. Triplicate determinations were performed for each sample, and the averaged value was reported.

6. Determination of the BET and STSA Surface Area of the Organic Fillers

The specific surface area was determined by nitrogen adsorption according to the ASTM D 6556 (2019 Jan. 1) standard provided for industrial carbon blacks. According to this standard, the BET surface area (specific total surface area according to Brunauer, Emmett and Teller) and the external surface area (STSA surface area; Statistical Thickness Surface Area) were determined as follows.

The sample to be analyzed was dried to a dry substance content >97.5% by weight at 105° C. prior to the measurement. In addition, the measuring cell was dried in a drying oven at 105° C. for several hours before weighing in the sample. The sample was then filled into the measuring cell using a funnel. In case of contamination of the upper measuring cell shaft during filling, it was cleaned using a suitable brush or a pipe cleaner. In the case of strongly flying (electrostatic) material, glass wool was weighed in additionally into the sample. The glass wool was used to retain any material that might fly up during the bake-out process and contaminate the unit.

The sample to be analyzed was baked out at 150° C. for 2 hours, and the $Al_2O_3$ standard was baked out at 350° C. for 1 hour. The following $N_2$ dosage was used for the determination, depending on the pressure range:

p/p0=0-0.01: $N_2$ dosage: 5 ml/g
p/p0=0.01-0.5: $N_2$ dosage: 4 ml/g.

To determine the BET, extrapolation was performed in the range of p/p0=0.05-0.3 with at least 6 measurement points. To determine the STSA, extrapolation was performed in the range of the layer thickness of the adsorbed $N_2$ from t=0.4-0.63 nm (corresponding to p/p0=0.2-0.5) with at least 7 measurement points.

7. Determination of the Solubility in Alkaline Media

Determination of the alkaline solubility is carried out according to the method described in the following:

1. To determine the solubility of a solid sample, it must be present in the form of a dry, fine powder (dry matter content >98%). If this is not the case, the dry sample is ground or thoroughly mortared before determining the solubility.
2. The solubility is determined in triplicate. For this purpose, 2.0 g of dry sample each are weighed into 20 g 0.1 M NaOH each, respectively. If, however, the determined pH value of the sample is <10, the sample is discarded, and 2.0 g of dry filler are weighed into 20 g 0.2 M NaOH each instead. In other words, depending from the pH value (<10 or >10), either M NaOH is used (pH>10) or 0.2 M NaOH (pH<10) is used.
3. The alkaline suspension is shaken at room temperature for 2 hours, at a shaker rate of 200 per minute. If the liquid should contact the lid in the process, the shaker rate has to be reduced to prevent this from happening.
4. Then, the alkaline suspension is centrifuged at 6000×g.
5. The supernatant of the centrifugation is filtered through a Por 4 frit.
6. The solid after centrifugation is washed twice with distilled water, by repeating steps 4. to 6.
7. The solid is dried in the drying oven for at least 24 h at 105° C. until the weight remains constant.
8. The alkaline solubility is calculated as follows:

Alkaline solubility of the sample [%]=Mass of the undissolved proportion after centrifugation, filtration and drying [g]*100/mass of the dry product obtained in item 2 [g]

8. Determination of the pH Value

The pH was determined along the lines of ASTM D 1512 standard as described hereinafter. The dry sample, if not already in powder form, was mortared or ground to a powder. In each case, 5 g of sample and 50 g of fully deionized water were weighed into a glass beaker. The suspension was heated to a temperature of 60° C. with constant stirring using a magnetic stirrer with heating function and stirring flea, and the temperature was maintained at 60° C. for 30 min. Subsequently, the heating function of the stirrer was deactivated so that the mixture could cool down while stirring. After cooling, the evaporated water was replenished by adding fully deionized water again and stirred again for 5 min. The pH value of the suspension was determined with a calibrated measuring instrument. The temperature of the suspension should be 23° C. (±0.5° C.). A duplicate determination was performed for each sample and the averaged value was reported.

9. Determination of the Glass Transition Temperature

Measurement of the glass transition temperature is carried out according to DIN 53765-1994.

10. Determination of the Amount of Emissions

The content of outgassable organic compounds (emissions) is determined by thermal desorption analysis according to VDA 278 (May 2016). The total outgassable organic emissions are given as the sum of the measured values from the VOC and the FOG cycle. The concentration of the individual components is determined by assigning the signal peaks based on the mass spectra and retention indices.

11. Determination of the OH Group Density

Determination of the acidic hydroxyl groups available on the surface, including phenolic OH groups and phenolate groups (OH group density), was carried out qualitatively and quantitatively colorimetrically according to Sipponen. The method according to Sipponen is based on the adsorption of the alkaline dye Azure B to the acidic hydroxyl groups accessible on the filler surface, and is described in detail in the paper "Determination of surface-accessible acidic hydroxyls and surface area of lignin by cation dye adsorption" (Bioresource Technology 169 (2014) 80-87). The amount of surface-available acidic hydroxyl groups is given in mmol/g of filler.

The invention will now be explained in more detail with reference to exemplary embodiments, which, however, are not to be interpreted restrictively.

Example 1

In a first step, a finely divided particulate carbon material was produced from lignin by a hydrothermal treatment in water.

The material used for the first step was the lignin UPM BioPiva 190 (commercially available). The material used had a solubility in 0.1 M NaOH of 68.5%.

The lignin was mixed with water under stirring and thus diluted to a dry matter content (DM content) of 11%. Then, 7.5 g sodium hydroxide were added per 100 g of dry matter. The mixture was heated to 80° C. with stirring and after 1 hour a lignin solution with pH 10.1 was obtained.

The lignin solution was then heated to 220° C. and hydrothermally treated at 220° C. degrees for a duration of 480 minutes. Subsequently, the obtained suspension was cooled to room temperature.

This resulted in a pH of 8.8.

A sample of the suspension was centrifuged at 12,000 rpm and the residue obtained was dried. The dried residue was analyzed for BET and STSA. A multipoint BET of 39.4 $m^2/g$ and an STSA of 37.2 $m^2/g$ were measured.

The lignin suspension obtained was then dewatered and squeezed in a filter press and thus mechanically dewatered to a DM content of 39.4%. In this way, a filter cake was obtained.

The D50 of the particle size distribution of a sample of the suspended solid matter of the filter cake was 5 μm.

A sample of the filter cake was dried. The dried filter cake was analyzed for BET and STSA. A multipoint BET of 38.3 $m^2/g$ and an STSA of 36.1 $m^2/g$ were measured.

The filter cake obtained represents the finely divided, particulate carbon material pCM that is further treated (modified) in the second step.

In a second step, a finely divided, modified particulate carbon material (according to the invention) was recovered from the finely divided, particulate carbon material pCM by heating in a gas atmosphere.

From the finely divided, particulate carbon material pCM that was obtained after the first step, samples were taken and treated under different conditions in the second step (samples 1 to 5), or not treated by means of the second step, but only dried in air (reference sample REF).

Each sample was individually fed into a rotary tubular furnace that was continuously purged with nitrogen. The sample was first dried at a temperature of 80° C. and then heated to the process temperature indicated in Table 1 below and held for the indicated time, with the indicated gas composition being set. Then, the sample was cooled down to ambient temperature again.

TABLE 1

| | Sample 1 | Sample 2 | Sample 3 | Sample 4 | Sample 5 | REF |
|---|---|---|---|---|---|---|
| Gas | $N_2$ $O_2 < 2\%$ | $N_2$ $O_2 < 2\%$ | $N_2$ $O_2 < 2\%$ | $N_2$ $2\% < O_2 < 5\%$ | $N_2$ $2\% < O_2 < 5\%$ | Air |
| Temperature [° C.] | 190 | 190 | 220 | 190 | 220 | 105 |
| Time [min] | 15 | 30 | 15 | 15 | 15 | 15 |

The finely divided, particulate carbon material respectively obtained was then analyzed. The parameters given in the following Table 2 were measured:

TABLE 2

| | Sample 1 | Sample 2 | Sample 3 | Sample 4 | Sample 5 | REF |
|---|---|---|---|---|---|---|
| BET [$m^2/g$] | 41.2 | 41.4 | 39.8 | 39.3 | 37.4 | 41.1 |
| STSA [$m^2/g$] | 39.8 | 39.5 | 38.4 | 38.0 | 35.8 | 39.5 |
| OH group density [mmol/g] | 0.29 | 0.27 | 0.27 | 0.22 | 0.17 | 0.30 |

TABLE 2-continued

|  | Sample 1 | Sample 2 | Sample 3 | Sample 4 | Sample 5 | REF |
|---|---|---|---|---|---|---|
| OH group density [mmol/m$^2$] | 0.0070 | 0.0065 | 0.0068 | 0.0055 | 0.0045 | 0.0073 |
| D50 [μm] | 5.6 | 9.3 | 10.5 | 12.4 | 15.4 | 4.5 |
| Solubility in AcOH [%] | 27.8 | 27.6 | 27.3 | 14.6 | 13.7 | 28.7 |
| Solubility in 0.1M NaOH [%] | 24.8 | 24.3 | 22.1 | 15.3 | 8.5 | 25.7 |
| Reduction of fine division D50 | 1.2 | 2.1 | 2.3 | 2.8 | 3.4 | — |
| Reduction of fine division BET | 1.0 | 1.0 | 1.0 | 1.0 | 1.1 | — |
| Reduction of fine division STSA | 1.0 | 1.0 | 1.0 | 1.0 | 1.1 | — |
| VOC, max [μg/g toluene equiv.] | 24 | 31 | 22 | 25 | 22 | 639 |
| FOG, max [μg/g toluene equiv.] | 7 | 10 | 8 | 6 | 8 | 80 |
| VOC, phenol | 0 | 0 | 0 | 0 | 0 | 32 |
| VOC, guaiacol | 0 | 0 | 0 | 0 | 0 | 523 |
| VOC, 2-methoxy-4-methylphenol | 0 | 0 | 0 | 0 | 0 | 13 |
| VOC, 4-propylguaiacol | 0 | 0 | 0 | 0 | 0 | 11 |
| VOC, methanol | 14 | 0 | 14 | 13 | 13 | 11 |
| 14 C content [Bq/gC] | 0.227 | 0.227 | 0.228 | 0.228 | 0.228 | 0.228 |
| Carbon content [%] | 71.4 | 71.8 | 71.6 | 71.5 | 71.2 | 71.2 |
| Volatile constituents 950° C. [%] | 46.5 | 46.4 | 46.6 | 46.5 | 46.4 | 46.8 |
| Volatile constituents 200° C. [%] | 0.1 | 0.1 | 0.1 | 0.1 | 0.1 | 0.1 |
| Ash content [%] | 3.0 | 2.9 | 2.8 | 3.0 | 3.0 | 2.7 |

The samples 1-5 and the reference REF were respectively mixed into an EPDM matrix as filler. After vulcanization, a test specimen was swollen in aqueous NaOH (0.1 M). The swelling after 7 days is shown in the following Table 3. The swelling is determined according to DIN ISO 1817:2015:

TABLE 3

| | Vulcanizate cont. Sample 1 | Vulcanizate cont. Sample 2 | Vulcanizate cont. Sample 3 | Vulcanizate cont. Sample 4 | Vulcanizate cont. Sample 5 | Vulcanizate cont. REF |
|---|---|---|---|---|---|---|
| Swelling [%] | 24.5 | 20.1 | 19.8 | 15.7 | 12.2 | 40.1 |

The lower the determined solubility of the respective sample in 0.1% NaOH (cf. Table 2), the lower also the determined swelling in aqueous NaOH of the vulcanizate containing the respective sample as filler.

The preparation of the mixture for the compounds and the preparation of the vulcanizates was carried out according to the recipe of Table 4 and by means of the following processes:

TABLE 4

| Component of the mixture | Proportion of mixture [phr] |
|---|---|
| Keltan 8550C | 100.0 |
| Zinc oxide | 5.0 |
| Stearic acid | 1.0 |
| Sunpar 2280 | 60.0 |
| Material acc. to one of Samples 1 to 5 or reference sample REF | 140.0 |
| PEG 4000 | 2.0 |
| Sulfur | 1.5 |
| TMTM 80 | 1.9 |
| MBTS | 0.9 |
| ZDBC 80 | 3.7 |

The preparation of the mixtures was carried out according to the following method: The mixtures were prepared by means of a W & P Type GK1.5E mixer (intermeshing rotor geometry) with a filling ratio of 70%, with a mixing temperature of 40° C. and a speed of 40 rpm.

Vulcanization was carried out by baking-out at 160° C. according to the optimum t90 time determined in the rheometer.

The invention claimed is:

1. A particulate carbon material comprising:
   a $^{14}C$ content that is higher than 0.20 Bq/g carbon, but lower than 0.45 Bq/g carbon,
   a D50 of particle size distribution of less than 500 μm and of more than 0.5 μm, and
   an OH group density of at least 0.05 mmol/g and at maximum 0.4 mmol/g, and
   solubility of the particulate carbon material in alkaline liquids is less than 25%.

2. The particulate carbon material according to claim 1 comprising an ash content of less than 15% by mass, and more than 0.25% by mass.

3. The particulate carbon material according to claim 2, comprising an ash content of less than 4% by mass, more than 0.5% by mass.

4. The particulate carbon material according to claim 1, wherein the D50 of the particle size distribution is less than 250 μm, and more than 1 μm.

5. The particulate carbon material according to claim 1, wherein the D50 of the particle size distribution is more than 5 μm.

6. The particulate carbon material according to claim 1, wherein the solubility in alkaline liquids is less than 15%.

7. The particulate carbon material according to claim 1, wherein the alkaline liquids comprise aqueous solutions of NaOH (0.1 mol/l) and a soluble proportion is determined according to the method described in the description.

8. The particulate carbon material according to claim 1, wherein the OH group density is at least 0.075 mmol/g, and at maximum 0.35 mmol/g.

9. The particulate carbon material according to claim 1, comprising:
   the $^{14}C$ content that is higher than 0.23 Bq/g carbon, but lower than 0.45 Bq/g carbon, and/or
   no glass transition temperature measurable according to DIN 53765-1994, and/or
   a carbon content relative to ash-free dry substance between 60% by mass and 80% by mass, and/or
   a content of volatile constituents, measured at 950° C. according to DIN 53552, of more than 30% by mass, and/or
   a content of volatile constituents, measured at 200° C. according to DIN 53552 of less than 5% by mass.

10. The particulate carbon material according to claim 1 comprising: a BET surface area of at least 5 m²/g, and at maximum 200 m²/g.

11. The particulate carbon material according to claim 1, wherein a content of dimethyl sulfide, guaiacol and methylguaiacol (creosol) is below 1 mg/kg, respectively.

12. The particulate carbon material according to claim 1 obtained by a method that contains at least two process steps, wherein, in a first process step, a particulate carbon material pCM is provided that represents a precursor of the particulate carbon material according to claim 1 and is different therefrom, and which subsequently is modified, in a second process step, by heating under gas atmosphere, whereby the particulate carbon material according to claim 1 can be obtained, which optionally is odor-reduced.

13. The particulate carbon material according to claim 12, wherein before the heating under the gas atmosphere, the particulate carbon material obtainable according to the first process step had a D50 of the particle size distribution of less than 500 μm and more than 0.5 μm.

14. The particulate carbon material according to claim 12, wherein the OH group density of the employed particulate carbon material pCM is reduced or adjusted by the heating in under the gas atmosphere according to the second process step, whereby the particulate carbon material according to claim 1 with an OH group density as defined in claim 1 can be obtained.

15. The particulate carbon material according to claim 12, wherein the second process step is not performed under atmospheric air, but under a process atmosphere consisting of air enriched by means of inert gas, having an oxygen content of less than 15% by vol. and at least 0.1% by vol.

16. The particulate carbon material according to claim 12, wherein the particulate carbon material pCM provided in the first process step is obtained by precipitation of a starting material, optionally a lignin-based starting material, that is dissolved in whole or in part in a liquid.

17. The particulate carbon material according to claim 12, wherein a process temperature in the second process step is at maximum 50° C. below and at maximum 50° C. above the temperature of the following processing and/or the temperature of use, and the process temperature does not exceed a maximum temperature and does not fall below a minimum temperature.

18. The particulate carbon material according to claim 12, wherein the D50 of the particle size distribution of the modified particulate carbon material obtainable after the second process step is at maximum 5 times higher than the D50 of the particle size distribution of the particulate carbon material pCM provided in the first process step.

19. A method for producing the particulate carbon material according to claim 1, the method containing at least two process steps, wherein, in a first process step, a particulate carbon material pCM is provided that represents a precursor of the particulate carbon material according to claim 1 and is different therefrom, and which subsequently is modified, in a second process step, by heating under gas atmosphere, whereby the particulate carbon material according to claim 1 can then be obtained, which optionally is odor-reduced.

20. A method of utilizing the particulate carbon material according to claim 1 comprising: mixing the particulate carbon material as an additive with an ingredient to prepare a polymer mixture, optionally a rubber mixtures.

21. A vulcanizable rubber composition comprising at least one rubber and at least one filler component, wherein the filler component contains at least the particulate carbon material according to claim 1.

22. A vulcanized rubber composition obtainable by vulcanization of the vulcanizable rubber composition according to claim 21 comprising a swelling in alkaline liquids after 7 days of less than 25%.

* * * * *